Figure 1:
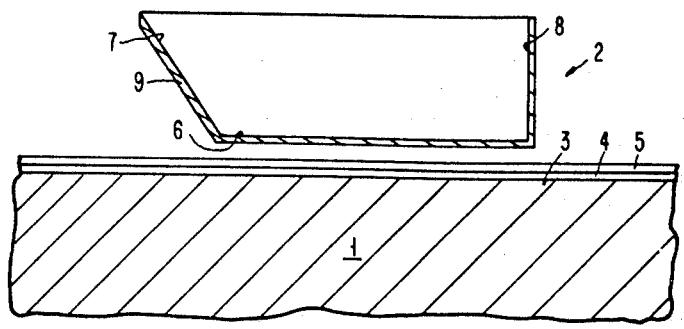

United States Patent [19]

Mönnich et al.

[11] Patent Number: 4,583,145

[45] Date of Patent: Apr. 15, 1986

[54] APPARATUS COMPRISING A LUBRICANT-COATED MAGNETIC DISC AND A MAGNETIC HEAD, AND METHOD OF MAKING SAID APPARATUS

[75] Inventors: Annelie Mönnich, Gau Bickelheim; Michael Glatzel, Hahnheim; Holger Hinkel, Böblingen; Gerhard Kaus, Mötzingen; Georg Kraus, Wildberg, all of Fed. Rep. of Germany; Ulrich Künzel, San Jose, Calif.; Erhard Max, Bad Liebenzell, Fed. Rep. of Germany

[73] Assignee: International Business Machines Corporation, Armonk, N.Y.

[21] Appl. No.: 604,798

[22] Filed: Apr. 27, 1984

[30] Foreign Application Priority Data

Feb. 5, 1983 [DE] Fed. Rep. of Germany ..... 83104289

[51] Int. Cl.$^4$ ............................................... G11B 5/72
[52] U.S. Cl. ..................... 360/135; 427/128; 427/131; 427/132; 428/329; 428/414; 428/446; 428/447; 428/694; 428/695; 428/900; 428/422
[58] Field of Search ............... 428/422, 695, 421, 694, 428/900, 329, 413, 414, 446, 447; 427/128, 131, 132; 360/134–136

[56] References Cited

U.S. PATENT DOCUMENTS

| | | | |
|---|---|---|---|
| 4,069,360 | 1/1978 | Yanagisawa | 428/447 |
| 4,152,487 | 5/1979 | Yanagisawa | 428/694 |
| 4,307,156 | 12/1981 | Yanagisawa | 428/694 |
| 4,327,139 | 4/1982 | Schaefer | 428/422 |
| 4,380,558 | 4/1983 | Yanagisawa | 428/694 |
| 4,404,247 | 9/1983 | Burguette | 428/694 |
| 4,434,210 | 2/1984 | Nakajima | 428/694 |
| 4,526,836 | 7/1985 | Mukai | 428/422 |
| 4,529,659 | 7/1985 | Hoshino | 428/422 |

*Primary Examiner*—Ellis P. Robinson
*Attorney, Agent, or Firm*—Joseph G. Walsh

[57] ABSTRACT

The magnetic disc comprises a magnetizable layer (1) to which an adhesion promoting layer (4) and thereto a lubricant film (5) are applied. Onto the substrate of the magnetic head (2) an adhesion reducing layer (9) is deposited. The apparatus can also show only one adhesion-influencing layer. The layers (4) and (9) are formed by the reaction of a sililating agent with reactive groups on the surface of the magnetizable layer (1), or of the substrate of the magnetic head (2), respectively. The sililating agents used differ in their terminal groups of which one category produce van der Waals bonds to the lubricant molecules, and the other is chemically indifferent relative to the lubricant molecules.

The two layers (4) and (9) are made e.g. by the spin-coating of a solution of the sililating agent, and subsequent drying.

The apparatus ensures a homogeneous coating of the magnetizable layer (1) with lubricant, and it prevents the pick-up of lubricant by the substrate of the magnetic head (2).

7 Claims, 2 Drawing Figures

APPARATUS COMPRISING A LUBRICANT-COATED MAGNETIC DISC AND A MAGNETIC HEAD, AND METHOD OF MAKING SAID APPARATUS

DESCRIPTION

1. Technical Field

The invention relates to an apparatus which comprises a magnetic disc and a magnetic head. The magnetic disc side which faces the magnetic head is formed of a magnetizable layer of polymeric binder with magnetic particles dispersed therein. A lubricant film is applied on the magnetic layer. The substrate of the magnetic head exerts an adsorptive influence on the lubricant. The invention also relates to a method of making the apparatus.

2. Background Art

From German Auslegeschrift No. 28 39 378, a magnetic disc with a magnetizable layer provided thereon on at least one side is known which finely distributed in a polymeric binder and the usual additives contains the magnetic particles. On the surface of the magnetizable layer a thin lubricant film is applied which, during operation in which with high numbers of revolution the magnetizable layer is to interact with a magnetic head, is to reduce the wear of magnetic disc and magnetic head. It is also known from the abovementioned German Auslegeschrift to use perfluoropolyether oil mixtures as a lubricant. However, the lubrication did not reach its full effect, and it furthermore presented additional problems. probably as the consequence of an inhomogeneity of the surface tension, the lubricant did not completely wet the magnetizable layer but formed microscopic droplets in other places instead. It was also found that the magnetic head picks up lubricant from the disc, particularly in those places where lubricant droplets have formed on the magnetizable layer, but also where there was a uniform lubricant coating, and it has become evident that in the latter places the removed lubricant is replaced only incompletely by the flow from the still wetted regions. The pick-up of the lubricant is due to the fact that it adheres also to the material which forms the substrate of the magnetic head with the consequence that when the magnetic head does not move for some time relative to the magnetizable layer the lubricant, which at first is picked up by the magnetic head at the back in the form of a droplet, is drawn under the influence of capillary forces along the lower side of the magnetic head into the space between magnetic head and magnetizable layer, and that consequently the magnetic head and the magnetic layer adhere to each other, which if the immobility of the magnetic head extends over a sufficient period, and if therefore the adhesive effect is correspondingly strong, may cause the tearing-off of the magnetic head from its holder upon the re-start of the record carrier.

DISCLOSURE OF THE INVENTION

It is the object of the invention to provide an apparatus which comprises a lubricated magnetizable layer and a magnetic head, and where the pick-up of the lubricant by the magnetic head is substantially excluded, and a method of making such an apparatus.

This object is achieved with an apparatus of the above specified type, with the features of the characterizing part of claim 1, and with a method of the above specified type with the features of the characterizing part of claim 8.

Both the adhesion promoting layer and the impregnation can individually achieve the object involved. However, for reliably effecting it also in long-term use and under conditions of stress, and in order to be as flexible as possible in the selection of the materials for the adhesion promoting layer and the impregnation and of the lubricant it is of advantage to combine the adhesion promoting layer and the impregnation in the apparatus.

The layer applied on the magnetizable layer, in the following called adhesion promoting layer, is bonded to the magnetizable layer via chemical bonds, and therefore very strongly. The adhesive forces between the adhesion promoting layer and the lubricant are much stronger than the cohesion forces between the molecules of the lubricant. Therefore a complete wetting (spreading) of the magnetizable layers is reached. However, as the bonding of the lubricant layer to the adhesion promoting layer is effected via van der Waals bonds the lubricant does not only wet the adhesion promoting layer but there exists very good adhesion between both layers. The adhesion promoting layer can furthermore prevent a wettability of the magnetizable layer with the lubricant caused by the effect of autophobia. The features involved are the following.

When a coating material is applied on a substrate, as e.g. on the magnetizable layer, the coating molecules directly against the substrate can align toward the substrate. The consequence of such alignment can be that only predetermined molecular groups of the coating material molecules adhering to the substrate can extend toward the coating molecules that are not adjacent the substrate and that from the main quantity. The autophobia effect now consists in that the adhesion of the coating molecules forming the main quantity is lower at the abovementioned molecular groups than the cohesion of these coating molecules among each other, with the consequence that the coating material shows a tendency toward the forming of droplets rather than toward a homogeneous layer.

The application of the adhesion promoting layer in accordance with the invention furthermore effects a homogeneous, well-adhering coverage of the magnetizable layer with lubricant, another effect is that if the lubricant, by interaction with the magnetic head, is removed from a particular point of the magnetizable layer the removed lubricant is replaced by flowing-in lubricant from the vicinity of such a point, i.e. that the magnetic head never reaches any point of the magnetizable layer not wetted by lubricant.

The impregnating (i.e. applying the adhesion reducing layer) of the lower surface and of the front and back surface of the magnetic head has precisely the opposite effect relative to the adhesion promoting layer on the magnetizable layer, i.e. a reduction of the relatively strong adhesion of the lubricant to the material of the magnetic head substrate. The above effect can also be caused by an autophobia effect, e.g. in that for impregnation, or for forming the adhesion reducing layer a material is used which can fix a monomolecular lubricant layer in such a manner that its molecules are aligned such that the adhesion of further lubricant molecules relative to that monomolecular layer is lower than the cohesion of the further lubricant molecules among each other. The consequence thereof is that the monomolecular lubricant layer is only poorly wetted by additional lubricant, i.e. that this additional lubricant does not adhere well. The consequence of reduced adhesion of the lubricant to the magnetic head substrate is that the substrate does not, or only negligibly, pick-up lubricant from the magnetizable layer, and that therefore there is no lubricant depletion in individual parts of the magnetizable layer. Since the magnetic head practically no longer picks up the lubricant in bigger drops, and since therefore the physical conditions (capillary effect) for the creeping of the lubricant between the magnetizable layer and the magnetic head substrates do no longer apply, it is even more important that the magnetic head can no longer stick to the magnetizable layer in the stationary state of the record carrier (capillary depression).

Structures are known where the adhesion of the lubricant to magnetic record carriers is improved by a layer applied on the magnetic layer, but in two of the known structures (German Auslegeschrift No. 26 48 303 and German Offenlegungsschrift No. 19 65 482) the magnetic layers do not consist of a dispersion of magnetic particles in a polymeric binder, but of metal, and the adhesion promoting layer is produced by the oxidation of the surface of the magnetic layer, and the lubricant is bonded to the adhesion improving layer not by van der Waals bonds, but chemically via hydrogen bridges, or merely by adsorption. In the only known such structure where the magnetic layer consists of a dispersion of magnetic particles in an organic binder, a layer of solid lubricant and a layer of fluid lubricant are applied on the magnetic layer, the solid lubricant being obviously not bonded via chemical bonds to the magnetic layer.

The method as disclosed by the invention is very simple, and owing to the multitude of commercially available sililating agents it permits to produce, on the one hand, an adhesion promoting layer adapted optimally to the material of the magnetizable layer and to the lubricant used, and on the other an adhesion reducing layer optimally adapted to the material of the magnetic head substrate and to the lubricant used.

Advantageous developments of the arrangement as disclosed by the invention, and of the method as disclosed by the invention are specified in the subclaims.

DRAWINGS

The invention will be described with reference to embodiments illustrated by drawings. The drawings show the following.

Figure 2:
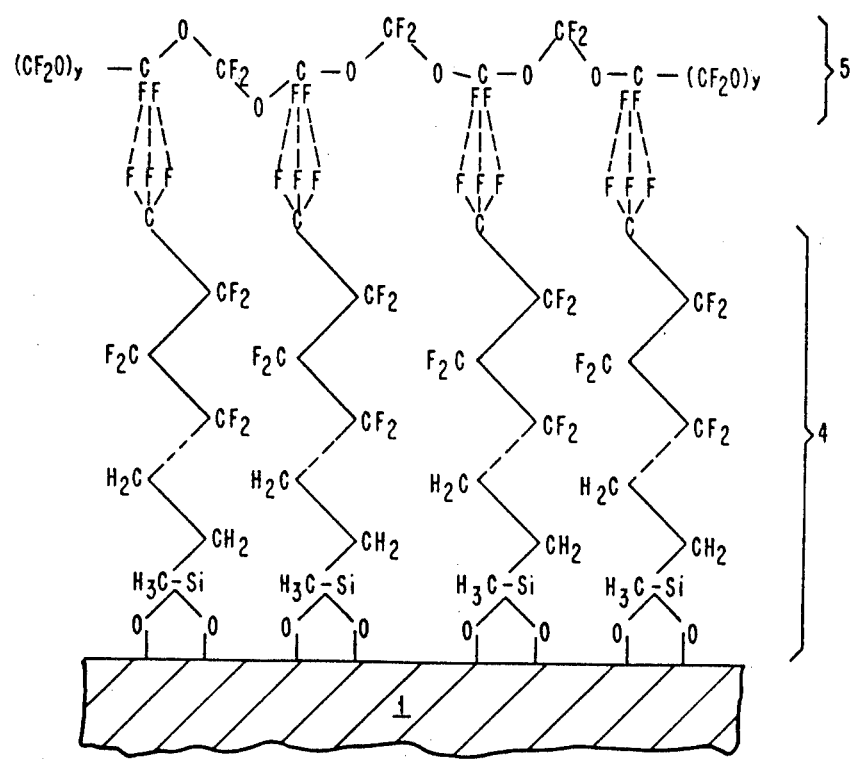

FIG. 1 in a schematic cross-section the structure of the apparatus in accordance with an embodiment of the invention, and FIG. 2 a model display which is to illustrate the function of the adhesion promoting layer upon the adhesion of the lubricant to the magnetizable layer.

The apparatus of FIG. 1 comprises a magnetizable layer 1, an adhesion promoting layer 4 deposited on surface 3 of magnetizable layer 1, a lubricant layer 5 deposited on adhesion promoting layer 4, magnetic head 2 provided at a small distance from the magnetizable layer, and an impregnation consisting of adhesion reducing layer 9 and covering lower surface 6 of magnetic head 2.

Magnetic head 2 is a thin film magnetic head, but the apparatus according to the invention may also comprise another type of magnetic head.

The thin film magnetic head consists of a substrate in the form of a small ceramic block, and the thin film magnet is suitable for writing in, and reading. The ceramic block is of carriage form, 4 mm long, 3 mm wide, and 0.75 mm high, and in its lower surface there is a relatively wide, flat groove in parallel to the longitudinal axis so that there remain only two narrow skids which in the region of the one end of the carriage ascend at an angle of approximately 1°. The substrate is suspended over the magnetic disc with the skids in downward direction, in such a manner that the rotating magnetic disc moves in parallel to the longitudinal axis of the carriage under it from the end with the ascending skids to the other end. On the back front of the carriage two thin film magnets are provided by means of evaporation, with magnetic yokes directed downward, i.e. toward the skids, and with conductor coils round one respective of the yokes. The thin film magnets are covered with aluminum oxide.

Although with the apparatus of FIG. 1 comprising layer 4 as well as layer 9 the essential improvement relative to the known apparatus is achieved, apparatus containing only either layer 4 or only layer 9 can be used, too, to counteract the pick-up of lubricant by the magnetic head.

Magnetizable layer 1 is applied on a substrate which usually consists of a metal plate on aluminum basis, and it is made of a dispersion of ion oxide particles in an organic binder. The organic binder consists for instance—not necessarily—of an epoxide resin, and typically of an epoxide resin of the bisphenol A-epichlorohydrin type. If a perfluoropolyether is used as a lubricant, adhesion promoting layer 4 preferably consists of the product of the reaction between the free OH groups at surface 3 and a perfluorinated or at least partly fluorinated sililating agent. The formulas of the typical representatives of suitable sililating agents are given as follows.

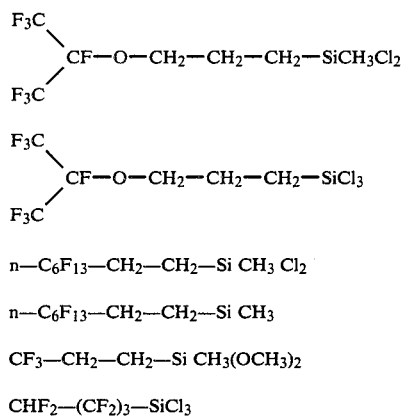

$$n-C_6F_{13}-CH_2-CH_2-Si\ CH_3\ Cl_2$$

$$n-C_6F_{13}-CH_2-CH_2-Si\ CH_3$$

$$CF_3-CH_2-CH_2-Si\ CH_3(OCH_3)_2$$

$$CHF_2-(CF_2)_3-SiCl_3$$

All these compounds obviously comprise at the silicon a relatively long carbon chain including, if necessary, an ether grouping, at least two fluorine atoms forming a compound with the terminal carbon atom particularly at the free end of the chain.

The co-action of the adhesion promoting layer produced of one of the abovementioned materials with the magnetizable layer consisting of epoxide resin and $Fe_2O_3$ on the one hand, and of the lubricant layer consisting of a perfluoropolyether oil on the other will be described with reference to FIG. 2 where magnetizable layer 1 is connected to adhesion promoting layer 4 via oxygen bridges. The connection between magnetizable layer 1 and the molecules forming layer 4 is established by a chemical reaction between free OH groups on surface 3 of magnetizable layer 1, and the sililating agent n—$C_6F_{13}(CH_2)_2$—$Si(CH_3)X_2$, X representing a reactive group, as a halogen or an $OCH_3$ group. The material forming adhesion promoting layer 4 is thus bonded by a genuine chemical bond, and consequently very tightly to magnetizable layer 1. It is obvious that, although the number of oxygen bridges on surface 3 of magnetizable layer 1 is relatively small, the sililating agent residues bonded to these oxygen bridges form a practically homogeneous coverage of the magnetizable layer owing to the relatively high volume of said sililating agent. Inter alia the homogeneous cover comprising hydrophobic groups optimally protects, the oxygen bridges against hydrolysis. From the structure of the sililating agent used, and the position of the reactive group in the molecule it is concluded that the surface of adhesion promoting layer 4 facing away from magnetizable layer 1 consists of $CF_3$ groups. These $CF_3$ groups can interact with the $CF_2$ groups of the lubricant, forming van der Waals bonds. Such a bond is strong enough to make a lubricant molecule stick strongly to the adhesion promoting layer. However, it is weaker than genuine chemical bond, and therefore the lubricant molecules shift easily in parallel to the surface of adhesion promoting layer 4. While without an adhesion promoting layer the lubricant does not completely wet (contact angle more than 0°) the magnetizable layer and therefore, also because of the known energetic heterogenity (i.e. in the microscopic range, polar and non-polar spots exist closely beside each other) tends to form droplets on the magnetizable layer, the lubricant does not only spread (contact angle 0°) on adhesion promoting layer 4 but also shows a considerable chemical affinity thereto. For that reason, and because the surface of adhesion promoting layer 4 is energetically homogeneous and therefore has a homogeneous surface tension, the surface of adhesion promoting layer 4 is fully covered with a lubricant layer 5. The layer is advantageously generated in such a manner that a solution of the sililating agent is applied on the magnetic layer e.g. by immersion, spraying, or spin-on, that subsequently the magnetic disc is dried in a dry atmosphere, e.g. in a desiccator, either at room temperature for approximately one day, or at a temperature of approximately 100° for approximately 2 hours. In this reaction, the reactive group of the sililating agents preferably consisting of a halogen or an alcoholic group reacts with the hydrogen of the OH groups on the surface of the magnetizable layer, forming a hydrogen halide or an alcohol, and the silicon is bonded to the substrate via an oxygen bridge, with a monomolecular layer being formed if monofunctional silanes are used. With bi- or trifunctional silanes multilayer structures can be produced by means of hydrolysis.

The substrate of magnetic head 2 preferably consists of a $TiC/Al_2O_3$ sinter material. The aluminum oxide composition in this product shows on its surface—like the magnetizable layer—free OH groups. These polar groups can interact with polar groups in gases or liquids, and therefore act adsorbingly for gases and liquids with such groups. There also exist other materials that can be used as substrates for thin film magnetic heads. Particularly in those cases where these materials are fully or partly oxidic they also have polar groups on their surface, and therefore adsorb gases and liquids of a corresponding constitution. However, since the $TiC/Al_2O_3$ sinter material has particularly advantageous characteristics, and because, as pointed out above, it can be considered representative for a major group of materials owing to its adhesion properties, the following description refers exclusively to magnetic head substrates of $TiC/Al_2O_3$ sinter material. However, the description can also be applied to other materials.

Perfluoropolyether oils, i.e. compounds with a very low surface tension which are advantageous as lubricants for magnetic discs of the kind mainly discussed here, contain strongly apolar groups, and the substrate of magnetic head 2 therefore picks up lubricant molecules, with the consequence that the lubricant wets the substrate surface at least partly, i.e. the contact angle does not differ very much from 0°. The above discussed problems appear particularly in those cases where the lubricant forms droplets on the magnetic disc surface, i.e. the absorption of lubricant by the magnetic head, and the "sticking" of the magnetic head to the magnetic disc, because under the influence of capillary forces acting between the lower side of the magnetic head and the surface of the magnetic disc, the lubricant adhering to the back front of the magnetic head is pulled between magnetic head and magnetic disc.

Preventing the absorption of lubricant by the magnetic head is achieved in accordance with the invention in that an adhesion reducing layer is applied on lower surface 6 and front and back surface 7 and 8, respectively, of magnetic head 2. The preferred embodiment of this layer is chemically bonded to the magnetic head substrate, and on its surface facing away from the substrate mainly comprises groups not closely related chemically to the lubricant. The adhesion reducing layer is preferably made in the same manner as the adhesion promoting layer. A sililating agent is used there, which at the silicon on the one hand comprises a group that can react with the free OH groups at the substrate surface, and that on the other has an organic residue whose terminal group facing away from the substrate surface meets the condition of not being chemically related to the lubricant material, e.g. to a perfluoropolyether oil. As a sililating agent for making the adhesion reducing layer the following compounds with the general formula can be used.

$R^1R^2R^3Si\ X_1$, $R^1R^2Si\ X_2$ and $R^1Si\ X_3$, where X can represent —Cl, —$OCH_3$, —$OC_2H_5$, or —$OSO_2$—$CF_3$, and $R^1$, $R^2$, $R^3$ $CH_3$—, $C_2H_5$—, —$C_6H_{13}$, —$C_{18}H_{37}$—, —$C_6H_5$, partly fluorinated alkyl groups, or

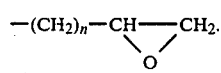

In spite of the relatively low number of OH groups on the substrate surface, the organic residues joint to the silicon atoms completely cover the substrate surface owing to their relatively great volume. The complete coverage prevents a hydrolysis of the silicon-oxygen compounds, and furthermore ensures that the tension over the substrate surface is substantially homogeneous. Owing to the above described deposition of the adhesion reducing layer, the contact angle between substrate and lubricant increases from a value which with the unprocessed substrate surface is only slightly greater than 0°, to a value of up to 31°, i.e. the adhesion of the lubricant to the magnetic head substrate is decreased considerably.

A deteriorated adhesion of the lubricant to the substrate of the thin film magnetic head can also be achieved in that a layer chemically bonded to the substrate surface is generated which supports the autophobia effect, i.e. it is possible also in this manner to prevent an important pick-up of lubricant by the substrate, and thus the adhering of the substrate to the magnetic disc.

The invention will now be described with more detail with reference to specific examples.

Examples 1 to 3 refer to the application of a perfluoropolyether oil used as lubricant onto a magnetizable layer which consists of a dispersion of iron oxide particles in an epoxide resin on the basis of bisphenol A-epichlorohydrin, without (example 1) and with (examples 2 and 3) support of a layer influencing adhesion. Examples 4 to 7 relate to the behavior of a substrate of a thin film magnetic head consisting of a TiC/Al$_2$O$_3$ sinter product, relative to a perfluoropolyether oil serving as lubricant. In examples 5 to 7 but not in example 4 the substrate is coated with an adhesion-influencing layer.

The following table gives the sililating agents used in the examples for making the layer that influences lubricant adhesion, and in examples 1 to 3 the quantity of the fixed lubricant per disc, and as a measure for the homogeneity of lubricant coating the 1σ-value, in examples 1 to 3 the contact angle between the magnetizable layer and the lubricant, and in examples 4 to 7 the contact angle between the substrate and the coated substrate, respectively, and the lubricant.

on the magnetizable layer is that less lubricant is retained than on the unprocessed magnetizable layer. This is not surprising, because the hexamethyldisilazane is not a material which is at least partly fluorinated, and because therefore there can be no van der Waals bonds between the layer applied and the lubricant. However, the test with the hexamethyldisilazane shows (cp. the 1σ-value) that the homogeneity of the coating with lubricant is much higher than that of the uncoated magnetizable layer. If as in example 3 the layer is made of a practically perfluorinated sililating agent the comparison between examples 1 and 3 shows that the quantity of the retained lubricant is much higher, and the homogeneity of the coating with lubricant is much better than in connection with the uncoated magnetizable layer.

EXAMPLES 4 TO 7

In example 4, the substrate of the thin film magnetic head was not coated with an adhesion-influencing layer. In example 5, the substrate was immersed for 1 minute in a 0.1% solution of methacrylic propyltrimethylsilane in a mixture consisting of 95% methylalcohol and 5% water, and having room temperature, and subsequently it was dried in the desiccator at room temperature for 12 hours. In example 6, the substrate was immersed at room temperature for 10 seconds in a 1% aqueous solution of Glasclad 18, and subsequently dried for 12 hours at room temperature in a desiccator. Glasclad 18 is a siloxane marketed by Petrach Systems Inc. under that trade name. In example 7, the substrate was exposed for

| Example No. | Substrates | Material for the layer influencing adhesion | Retained lubricant Quantity [mg] | deviation (1σ) | Contact ∢ |
|---|---|---|---|---|---|
| 1 | magnetizable layer | — | 15.9 ± 3.4 | 1.7 | ~2–3° |
| 2 | magnetizable layer | hexamethyl-disilazane | 12.6 ± 0.5 | 0.3 | 0° |
| 3 | magnetizable layer | n-C$_6$F$_{13}$—(CH$_2$)$_2$—Si—Cl CH$_3$ | 22.3 ± 0.9 | 0.4 | 0° (spreading out) |
| 4 | substrate of the thin film magnetic head | — | | | ~0° (spreading out) |
| 5 | substrate of the thin film magnetic head | methacrylic propyl trimethylsilane | | | 6° |
| 6 | substrate of the thin film magnetic head | Glasclad | | | 24° |
| 7 | substrate of the thin film magnetic head | t-butyldimethyl-chlorosilane | | | 31° |

EXAMPLES 1 TO 3

In examples 1 to 3, 5 magnetic discs have been respectively processed. In example 1, no layer influencing lubricant adhesion was applied. In examples 2 and 3, the magnetic discs were first immersed rotatingly into a 10% solution of hexamethyldisilazane (example 2), or of n—C$_6$F$_{13}$(CH$_2$)$_2$—Si(CH$_3$)—Cl (example 3)

in freon for 5 minutes. During that process, the magnetizable layers were brought into intimate contact with the sililating agent. There followed a drying process at 100° C. in a dry atmosphere, e.g. in a desiccator. In all three examples, lubricant was subsequently applied on the magnetizable layers, the lubricant was then rubbed in, and the surplus was wiped off. Example 2 shows that the effect of a layer produced of hexamethyldisilazane 2 hours to a refluxing (110° C.), 0.1% solution of t-butyldimethylchlorosilane in toluol, and subsequently dried for 12 hours in a desiccator. Onto the thus processed substrate, and a substrate on which no layer had been produced (example 4) a lubricant film was applied, and the respective contact angle between the substrate surface and the lubricant film was measured. A comparison of the contact angles of the four examples revealed that the contact angle could be considerably increased by the production of the adhesion-influencing layer on the substrate surface, particularly by the production of a layer of the t-butyldimethylchlorosilane.

We claim:
1. An apparatus comprising a magnetic disc and a magnetic head (2) above it, the lower surface of the magnetic head being covered with an adhesion reduc- ing layer (9), and the side of the magnetic disc facing the magnetic head comprising
   (a) a magnetizable layer (1) of a polymeric binder with magnetic particles dispersed therein,
   (b) a substantially mono-molecular adhesion promoting layer (4) completely covering the surface (3) of the magnetizable layer (1), and
   (c) a lubricant film (5) covering said adhesion promoting layer (4), with the adhesion promoting layer (4) comprising a product of the reaction between a material selected from the group consisting of

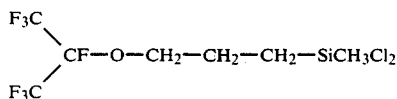

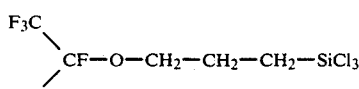

n—C$_6$F$_{13}$—CH$_2$—CH$_2$—SiCH$_3$Cl$_2$ n—C$_6$F$_{13}$—CH$_2$—CH$_2$—SiCl$_3$

CF$_3$—CH$_2$—CH$_2$—SiCH$_3$(OCH$_3$)$_2$ and,

CHF$_2$—(CF$_2$)$_3$—SiCl$_3$, and free OH groups on the surface of the polymeric binder.

2. Apparatus as claimed in claim 1, characterized in that the polymeric binder is an epoxide resin.

3. Apparatus as claimed in patent claim 1, characterized in that the lubricant film (5) comprises a perfluoropolyether oil, or of a mixture of such oils.

4. For use with a magnetic head having a surface covered with an adhesion reducing layer, a magnetic recording disc comprising, at its side facing the head when in operation,
   (a) a magnetizable layer (1) of a polymeric binder with magnetic particles dispersed therein,
   (b) a substantially mono-molecular adhesion promoting layer (4) completely covering the surface (3) of the magnetizable layer (1), and
   (c) a lubricant film (5) covering said adhesion promoting layer (4), with the adhesion promoting layer (4) comprising a product of the reaction between a material selected from the group consisting of

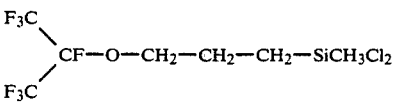

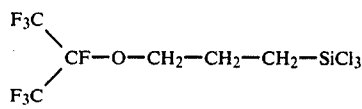

n—C$_6$F$_{13}$—CH$_2$—CH$_2$—SiCH$_3$Cl$_2$ n—C$_6$F$_{13}$—CH$_2$—CH$_2$—SiCl$_3$

CF$_3$—CH$_2$—CH$_2$—SiCH$_3$(OCH$_3$)$_2$ and,

CHF$_2$—(CF$_2$)$_3$—SiCl$_3$, and free OH groups on the surface of the polymeric binder.

5. Apparatus as claimed in claim 1, characterized in that the adhesion reducing layer (9) does not have any chemical affinity to the lubricant, and a lower surface tension than the magnetic head substrate surface.

6. Apparatus as claimed in claim 5, characterized in that the adhesion reducing layer (9) comprises a reaction product between a compound having the general formula R$^1$R$^2$R$^3$SiX$_1$, R$^1$R$^2$SiX$_2$ and R$^1$ SiX$_3$, with X representing —Cl, —OCH$_3$, —OC$_2$H$_5$, or —OSO$_2$—CF$_3$ and R$^1$, R$^2$, R$^3$ CH$_3$—, C$_2$H$_5$—, —C$_6$H$_{13}$, —C$_{18}$H$_{37}$—, —C$_6$H$_5$, partly fluorinated alkyl groups, or

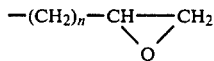

and similar groups and with the free OH groups on the surface of the substrate of the magnetic head (2), which substrate comprises of a TiC/Al$_2$O$_3$ sinter material.

7. Apparatus as claimed in any claim 1, characterized in that the magnetizable layer (1) comprises a dispersion of iron oxide particles in an epoxide resin, the adhesion promoting layer (4) comprises the reaction product between

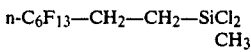

and the OH groups on the epoxide resin surface (3), the lubricant comprises a perfluoropolyetheroil, the substrate comprises the magnetic head (2) of a TiC/Al$_2$O$_3$ sinter material, and the adhesion reducing layer (8) comprises the reaction product between

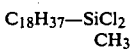

and the OH groups on the surface of the TiC/Al$_2$O$_3$ sinter material.

* * * * *